(12) United States Patent
Lunin (10) Patent No.: US 7,896,287 B2
(45) Date of Patent: Mar. 1, 2011

(54) SPLIT TORQUE GEARED POWER TRANSMISSIONS WITH COMPOSITE OUTPUT SHAFTS

(75) Inventor: Stepan V. Lunin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 744 days.

(21) Appl. No.: 11/835,841

(22) Filed: Aug. 8, 2007

(65) Prior Publication Data

US 2009/0038435 A1 Feb. 12, 2009

(51) Int. Cl.
*B64D 35/00* (2006.01)
*F16H 37/06* (2006.01)

(52) U.S. Cl. ...... 244/60; 244/17.11; 74/665 A; 74/665 B
(58) Field of Classification Search ............... 244/17.11, 244/60; 74/665 A, 665 B
See application file for complete search history.

(56) References Cited

U.S. PATENT DOCUMENTS

| 1,449,353 | A |   | 3/1923  | Seniw                  |
|-----------|---|---|---------|------------------------|
| 2,486,671 | A | * | 11/1949 | Normann ......... 74/417 |
| 3,375,727 | A | * | 4/1968  | Nasvytis et al. ....... 74/417 |
| 4,489,625 | A |   | 12/1984 | White                  |
| 5,135,442 | A |   | 8/1992  | Bossler, Jr.           |
| 5,233,886 | A |   | 8/1993  | Bossler, Jr.           |
| 5,363,929 | A | * | 11/1994 | Williams et al. ....... 175/107 |
| 6,428,443 | B1|   | 8/2002  | Dischler               |
| 6,612,195 | B2|   | 9/2003  | Gmirya et al.          |
| 7,100,468 | B2|   | 9/2006  | Gmirya et al.          |
| 7,165,474 | B2|   | 1/2007  | Bossler                |

FOREIGN PATENT DOCUMENTS

GB 590140 7/1947

OTHER PUBLICATIONS

Goldfarb/Lunin/Trubachev, "Direct Digital Simulation for Gears", vol. I, 2005 (pp. 1-100).

* cited by examiner

*Primary Examiner* — Joshua J Michener
(74) *Attorney, Agent, or Firm* — Haynes and Boone, LLP (57) ABSTRACT

A light weight, split torque, geared power transmission having a reduced number of gears and useful for, e.g., transmitting power from an engine to the main rotor of a rotorcraft, includes a ring gear having a pair of oppositely facing angular bevel gears respectively formed on opposite sides of a medial plane thereof, and a first pinion having an elongated drive shaft extending through the medial plane of the ring gear and disposed at an oblique angle relative thereto. The first pinion includes a pair of cylindrical gears mounted coaxially on the drive shaft and respectively disposed in conjugate meshing engagement with respective ones of the bevel gears of the ring gear. An elongated annular output shaft made of a strong, light weight composite material is coupled to a circumferential periphery of the ring gear.

13 Claims, 7 Drawing Sheets

SPLIT TORQUE GEARED POWER TRANSMISSIONS WITH COMPOSITE OUTPUT SHAFTS

STATEMENT REGARDING FEDERALLY SPONSORED RESEARCH OR DEVELOPMENT

This invention was made with Government support under Department of Defense contract number MDA972-03-9-004. The Government has certain rights in this invention.

BACKGROUND

This disclosure relates to mechanical power transmissions in general, and in particular, to compact, reduced weight and complexity, split torque, geared power transmission having composite output shafts for reduced weight.

The applications in which relatively large amounts of power need to be transmitted from one or more driving mechanisms, e.g., rotating turbines or engines, to a driven element, e.g., the tracks of a tank, the screw of a ship or submarine, or the main rotor of a helicopter, are legion. The problem with existing geared power transmissions is their relatively high weight-to-power transmission ratios. That is, as the amount of power that needs to be transmitted from the driving mechanism(s) to the driven mechanism(s) increases, the size and weight of the gears and supports in the transmission increase disproportionately. In some applications, e.g., hydroelectric power generating stations or ships, this increase in weight and size can be accommodated relatively easily, whereas, in others, e.g., aircraft and rotorcraft, the increased weight, size and complexity can severely compromise vehicle design and performance.

In an effort to address this problem, a number of so-called "split torque" geared power transmissions have been developed over the years. Examples of geared transmissions adapted to apply multiple torques from one or more relatively high-speed engines to a single, slower turning helicopter main rotor can be found in, e.g., U.S. Pat. Nos. 4,489,625 to G. White and 6,428,443 to L. Dischler. These prior solutions provide very limited reduction in weight because they utilize relatively large numbers of gears that require numerous, heavy gearing supports.

What is needed then is a simple, light weight split torque geared transmission that is capable of transmitting higher torques, but which has a reduced weight that is achieved by a reduction in the number of gears and support bearings required for the gears, together with the utilization of low weight, high strength composite materials.

SUMMARY

In accordance with the embodiments disclosed herein, split torque geared power transmissions are provided that are capable of transmitting torque from one or more high speed driving elements to a relatively slower turning driven element using a double sided bevel face ring gear and a cylindrical double pinion arrangement in which one or two of the pinions extend through the plane of the ring gear and mesh with the teeth on the opposite faces thereof, and in which a hollow output shaft coupled to the outer periphery of the crown face ring gear comprises a high-strength, low-weight, fiber-reinforced composite material.

In one exemplary embodiment, a split torque geared power transmission comprises a ring gear having a pair of oppositely facing angular bevel gears respectively formed on opposite sides of a medial plane thereof, together with a single first pinion having an elongated drive shaft extending through the medial plane of the ring gear and disposed at an oblique angle relative thereto. The first pinion includes a pair of cylindrical gears mounted coaxially on the shaft and respectively disposed in conjugate meshing engagement with respective ones of the bevel gears of the ring gear. An elongated annular output shaft is coupled to a circumferential periphery of the ring gear.

In another exemplary embodiment, a rotorcraft comprises a main rotor, including a power input shaft and a plurality of rotor blades coupled to the input shaft for rotation thereby, and an engine having an output shaft for rotatably driving the input shaft of the main rotor. A split torque geared power transmission is coupled between the output shaft of the engine and the input shaft of the main rotor. The transmission comprises a ring gear, including a pair of oppositely facing angular bevel gears respectively formed on opposite sides of a medial plane thereof, and a first pinion having an elongated drive shaft extending through the medial plane of the ring gear and disposed at an oblique angle relative thereto. The pinion includes a pair of cylindrical gears mounted coaxially on the shaft and respectively disposed in conjugate meshing engagement with respective ones of the bevel gears of the ring gear, and an input end coupled to the output shaft of the engine. An elongated annular output shaft of the transmission has an input end coupled to a circumferential periphery of the ring gear and an output end coupled to the input shaft of the main rotor.

In yet another exemplary embodiment, a split torque power transmission comprises a ring gear including a pair of oppositely facing angular bevel gears respectively formed on opposite sides of a medial plane thereof. A first pinion having an elongated drive shaft extends through the medial plane of the ring gear and is disposed at an oblique angle relative thereto. The first pinion is laterally offset from a central axis of the ring gear perpendicular to its medial plane, and includes a pair of cylindrical gears mounted coaxially on the shaft and respectively disposed in conjugate meshing engagement with respective ones of the bevel gears of the ring gear. A second pinion is laterally offset from the first pinion and has an elongated drive shaft also extending through the medial plane of the ring gear and disposed at an oblique angle relative thereto. The second pinion also includes a pair of cylindrical gears mounted coaxially on the shaft and respectively disposed in conjugate meshing engagement with respective ones of the bevel gears of the ring gear. An elongated annular output shaft, which in one embodiment, may comprise a composite material, is coupled to a circumferential periphery of the ring gear.

A better understanding of the above and many other features and advantages of the split torque power transmissions of the present invention, together with their many advantageous applications, can be obtained from a consideration of the detailed description of some exemplary embodiments thereof below, particular if such consideration is made in conjunction with the appended drawings, wherein like reference numbers are used to refer to like elements in the respective figures thereof.

DETAILED DESCRIPTION

Figure 1:
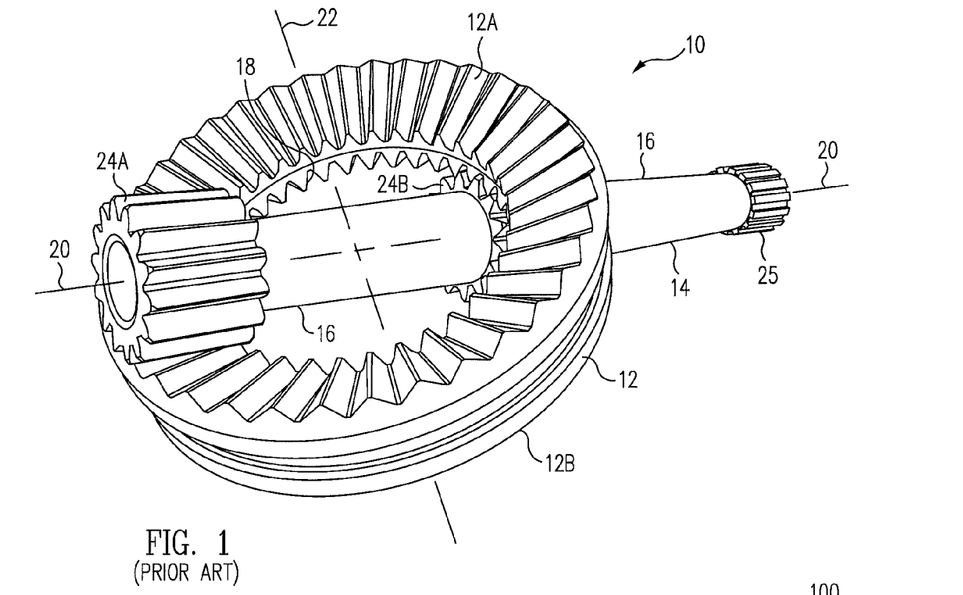
FIG. 1 is an upper side perspective view of a prior art gear arrangement with two meshing zones incorporating a single cylindrical pinion gear extending through the medial plane of and drivingly engaging opposite sides of a double sided, bevel face ring gear and used in a first exemplary embodiment of a split torque geared power transmission in accordance with this disclosure.

FIG. 1 is an upper side perspective view of the gears of a split torque geared power transmission 10 of a type illustrated in the E-Book, 1 V. Goldfarb and S. Lunin, *Direct Digital Simulation for Gears*, 2002, and characterized as "gears with two meshing zones." The transmission 10 includes a ring gear 12 having a pair of oppositely facing angular bevel gears 12A and 12B respectively formed on opposite sides of a medial plane of the gear, and a single first pinion 14 having an elongated drive shaft 16 extending through the medial plane of the ring gear and disposed at an oblique angle relative thereto. That is, the annular ring gear 12 includes a circular central opening, or "lumen" 18, through which one end of the first pinion 14 extends, with the long axis 20 of the pinion passing through a central axis 22 of the ring gear perpendicular to its medial plane and at an oblique angle relative thereto.

The first pinion 14 includes a pair of cylindrical gears 24A and 24 B mounted coaxially on the shaft 16 and respectively disposed in conjugate meshing engagement with respective ones of the bevel gears 12A and 12B of the ring gear 12. The first pinion 14 may also include a third gear 25, e.g., a spline gear, disposed at an input end thereof, through which power or torque is input to the transmission 10 by means of, e.g., an engine, motor or the like (not illustrated).

In the particular exemplary embodiment illustrated, the bevel face gears 12A and 12B of the ring gear 12 are illustrated as being conjugate to "straight," or involute cylindrical spur gears 24A and 24B of the first pinion 14. However, it should be understood that these gears may also comprise other types of non-spur types of gears, such as helical, spiral, Zerol, crowned, Coniflex, Novikov-Wildhaber, hypoid or others. Indeed, as discussed in more detail below in connection with a second exemplary transmission embodiment 100 hereof, the use of hypoid gears can provide certain advantages. Additionally, although the ring gear 12 is illustrated as being an angular bevel gear and the two gears 24A and 24B of the pinion 14 are illustrated as being cylindrical gears, as those of skill in the art will appreciate, this relationship can be reversed, such that the ring gear 12 comprises a double-faced "crown" gear, i.e., each having a pitch angle of 90 degrees, the two gears of the pinion can comprise bevel gears, and the respective pitch surfaces of the meshing gears may then comprise a pair of parallel planes.

Figure 2:
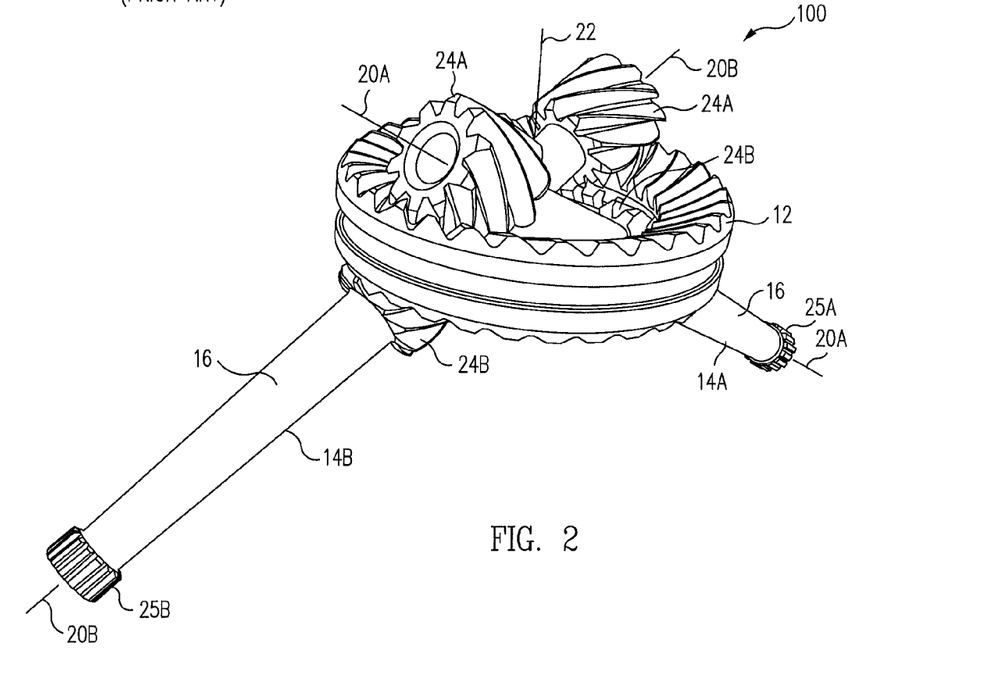
FIG. 2 is an upper side perspective view of a second exemplary embodiment of a split torque geared power transmission incorporating a pair of pinion gears drivingly engaging opposite sides of a double sided, bevel face ring gear.
Figure 3:
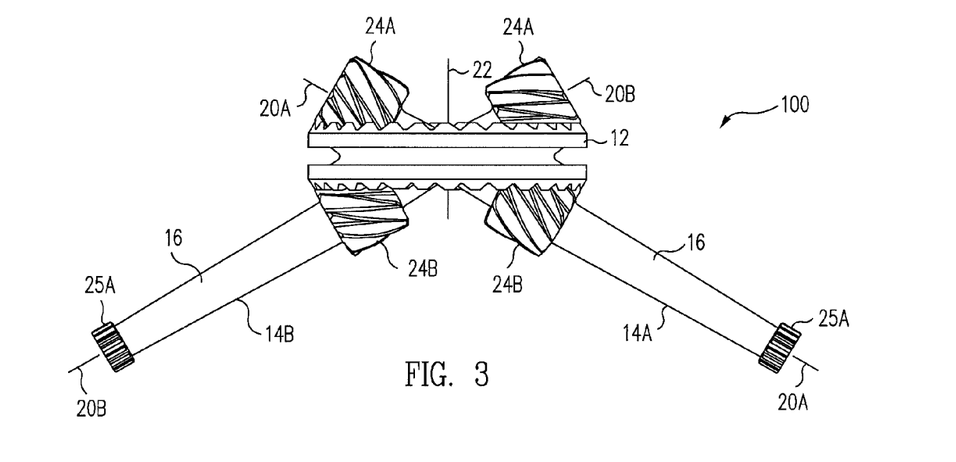
FIG. 3 is a side elevation view of the exemplary split torque transmission of FIG. 2.
Figure 4:
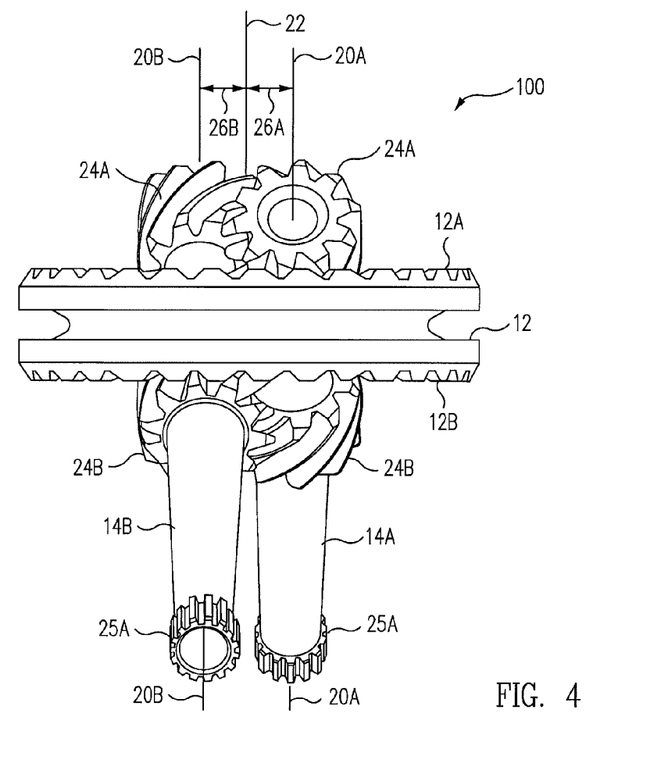
FIG. 4 is another side elevation view of the exemplary transmission of FIG. 2, rotated through 90 degrees, and showing a lateral offset between the respective axes of the ring gear and the two driving pinions thereof.

A second exemplary embodiment of a split torque geared power transmission 100 that incorporates a pair of driving pinions 14A and 14B, both drivingly engaging opposite sides of a double sided, bevel ring gear 12 is illustrated in FIGS. 2-4, wherein FIG. 2 is an upper side perspective view of the second embodiment, FIG. 3 is a side elevation view thereof, and FIG. 4 is side elevation view of the exemplary transmission of FIG. 2, rotated through 90 degrees to show lateral offsets 26A and 26B between the respective axes 20A, 20B of the two pinions 14A and 14B and the central axis 22 of the ring gear 12.

As is known in the automotive industry, the use of hypoid gears, i.e., gears having hyperboloid gear teeth, in a ring-gear-and-pinion combination enables the long axis 20 of the pinion 14 to be offset laterally from the central axis 22 of the ring gear 12, as illustrated in FIG. 4. This, in turn, enables a second, identical pinion 14B to be used in combination with the ring gear 12, as illustrated in FIGS. 2-4. Although hypoid gears are ~1-2% less efficient than, e.g., helical gears, this slight decrease in efficiency is more than made up for by the ability to incorporate a second pinion 14B within the transmission 100.

Thus, in the second embodiment 100, the first and second pinions 14A and 14B are each laterally offset from the central axis 22 of the ring gear 12 by distances 26A and 26B, respectively. Like the first pinion 14A, the second pinion 14B includes an elongated drive shaft 16 extending through the medial plane of the ring gear 12, but from the opposite side of the ring gear than the first pinion, and is disposed at an oblique angle relative thereto. Also like the first pinion, the second pinion includes a pair of cylindrical gears 24A and 24B mounted coaxially on the shaft and respectively disposed in conjugate meshing engagement with respective ones of the bevel gears 12A and 12B of the ring gear.

The respective long axes 20A and 20B of the two pinions 14A and 14B of the second embodiment 100 do not intersect the central axis 22 of the ring gear 12, as in the first embodiment 10 above, but instead, lie in respective vertical planes that are parallel to each other and spaced apart from the ring gear central axis by the distances 26A and 26B, respectively. As a practical matter, and for pinions that are identical to each other, the minimum value of this spacing is equal to the diameter of the shaft 16 of one of the pinions.

Figure 5:
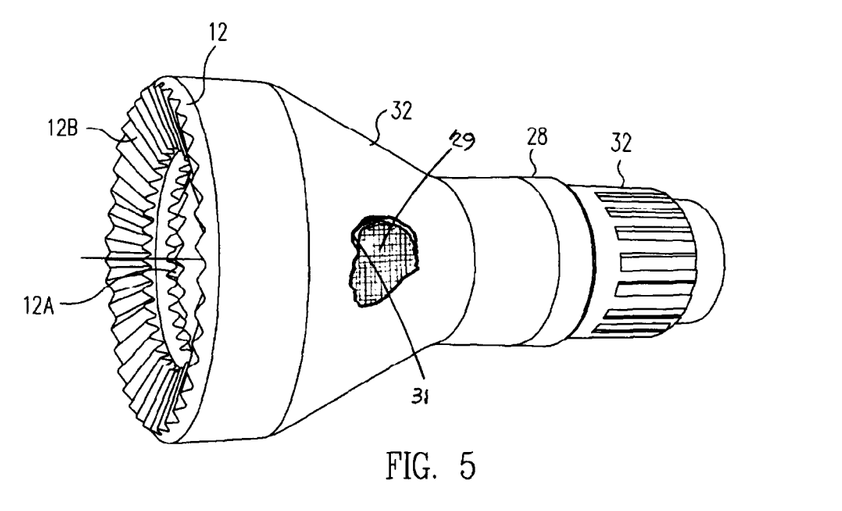
FIG. 5 is a side and lower end perspective view of the ring gear and an annular composite output shaft of the exemplary transmission, with the pinion(s) thereof omitted for clarity.
Figure 6:
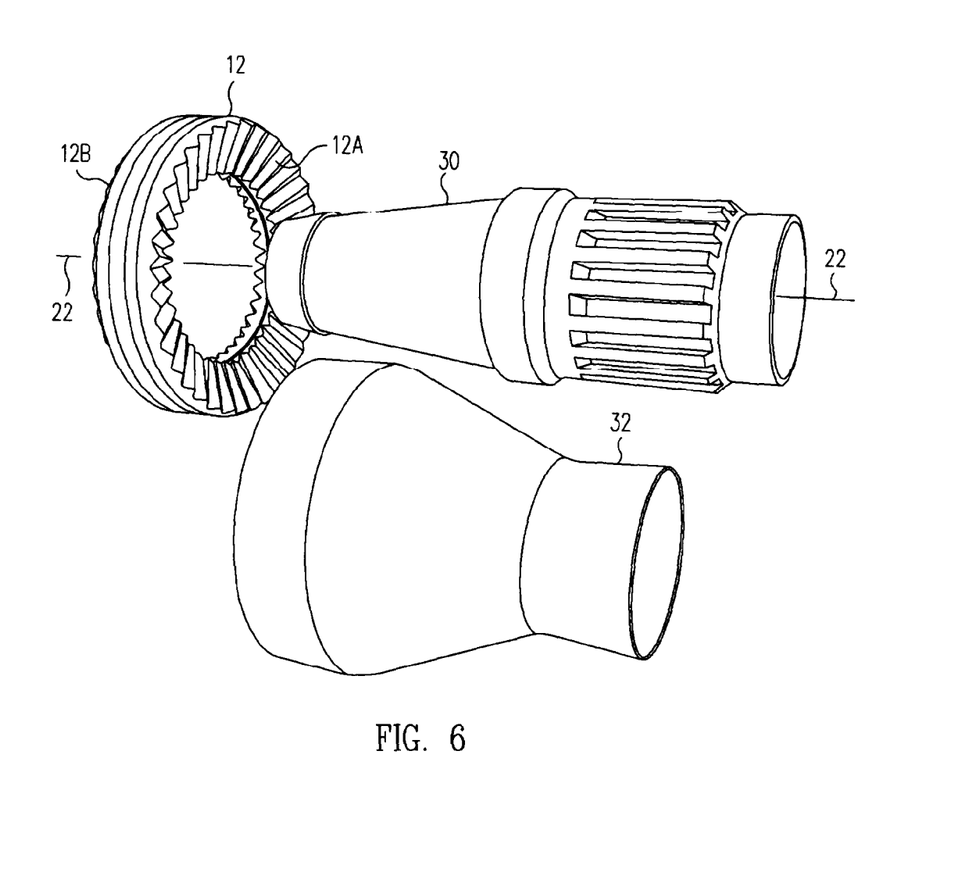
FIG. 6 is an exploded side and upper end perspective view of the ring gear and composite output shaft of the transmission.

As those of skill in the art will appreciate, it is necessary to couple output rotational power, or torque, from the transmissions 10 and 100, and in the exemplary embodiments hereof, this is effected by the provision of an elongated annular output shaft 28 that is coupled to a circumferential periphery of the ring gear 12, as illustrated in the side and lower or input end perspective view of FIG. 5, in which the pinion(s) is/are omitted for clarity. In a preferred exemplary embodiment, the output shaft 28 is made of a composite material and comprises an annular, frusto-conical input portion 30 having a large, input end coupled to the circumferential periphery of the ring gear 12, and an annular output portion 32 disposed coaxially with and having an input end coupled to a small, output end of the input portion 30, as illustrated in the exploded side and upper or output end perspective view of the ring gear 12 and composite output shaft 28 of FIG. 6.

The various composite systems that can be used advantageously in the output shaft 28 are numerous, and as illustrated, e.g., in FIG. 5, may comprise a plurality of reinforcing fibers 29, such as carbon, glass, boron or other types of known fibers, embedded in a resin matrix 31, such as epoxy or polyurethane.

Figure 7:
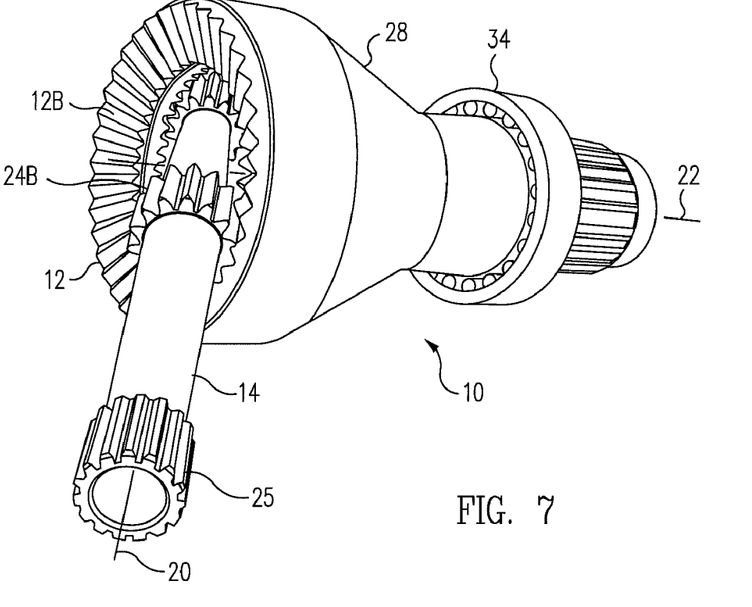
FIG. 7 is a perspective view of the exemplary transmission similar to FIG. 5, showing a single driving pinion disposed in driving engagement with opposite faces of the ring gear and a supporting roller bearing located at the upper end of the composite output shaft.
Figure 8:
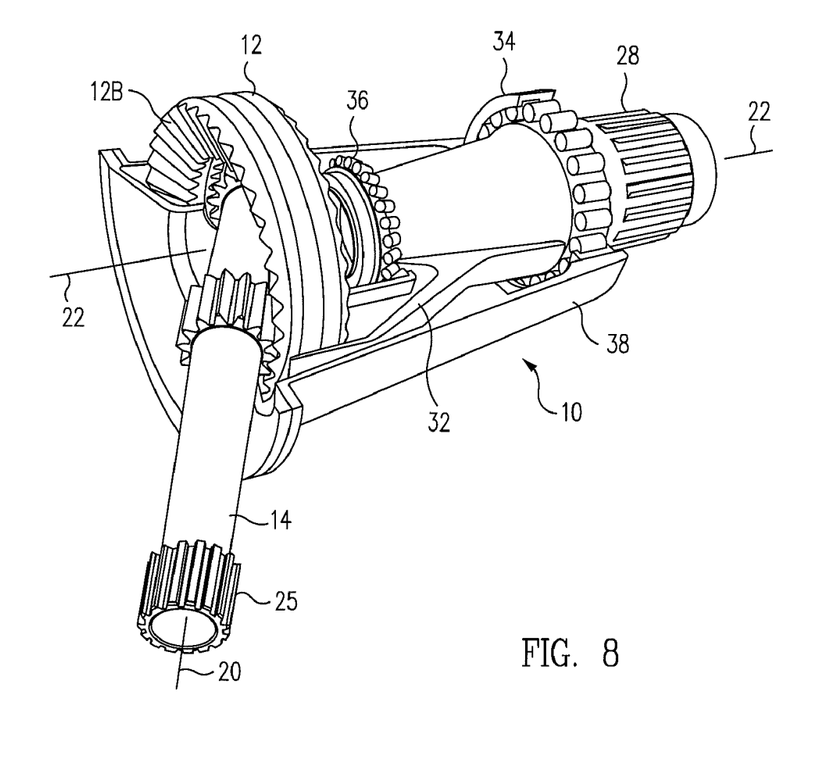
FIG. 8 is a breakaway perspective view similar to FIG. 7, showing a second supporting roller bearing and stationary bell housing support and end closure at the input end of the composite output shaft.

In the particular exemplary split torque transmissions 10 and 100 illustrated in the figures, the output shaft 28 is supported for rotation about a long axis 22 thereof, which corresponds to the central axis 22 of the ring gear 12, by a plurality of roller bearings, such as the support roller bearing 34 located at an output end of the output shaft 28 shown in FIG. 7, and the second supporting roller bearing 36 located at the lower end of the output shaft, as shown the breakaway view of FIG. 8.

Figure 9:
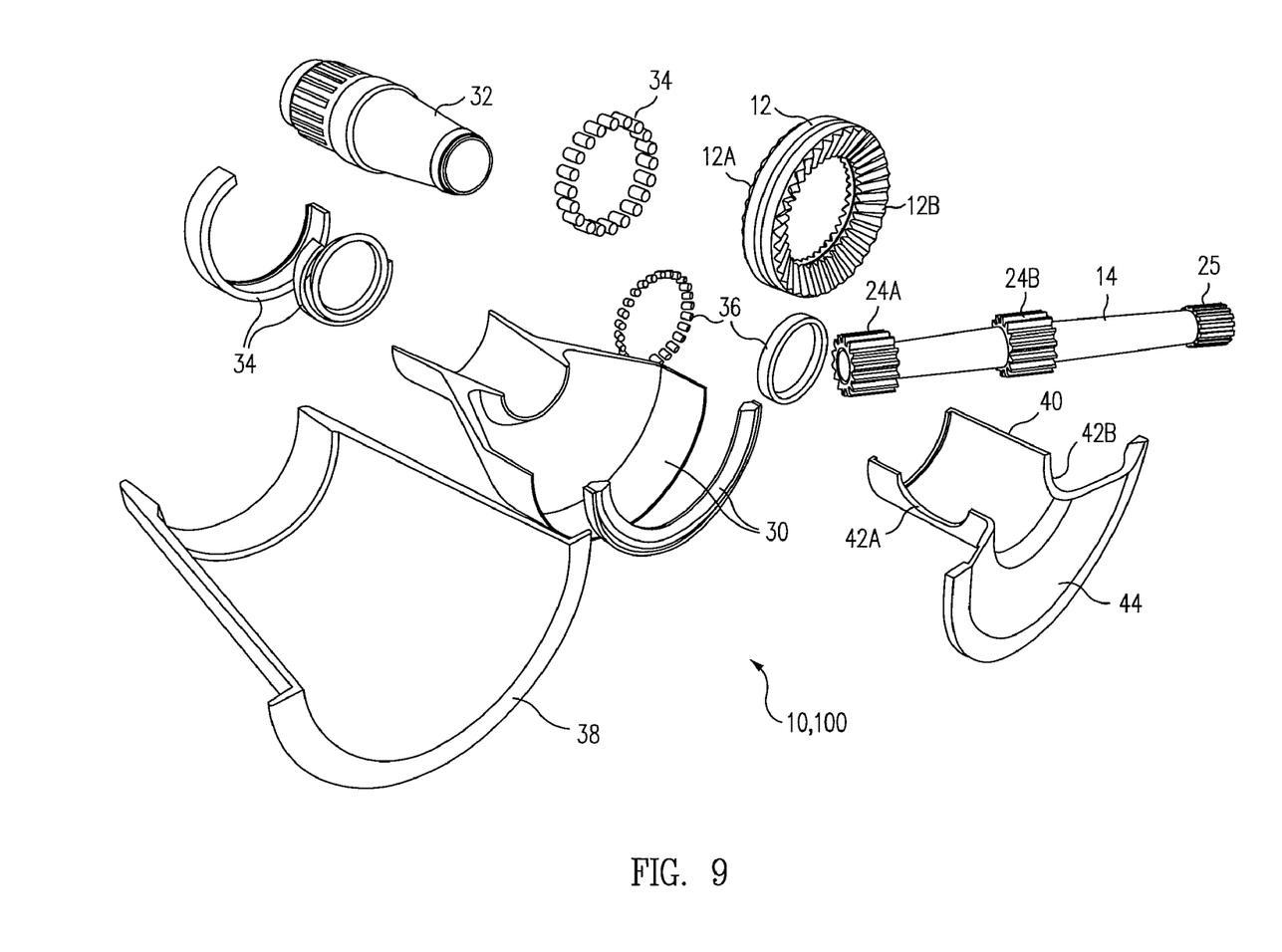
FIG. 9 is an exploded partially cross-sectional upper and input end perspective view of the first exemplary transmission, showing the respective parts thereof.
Figure 10:
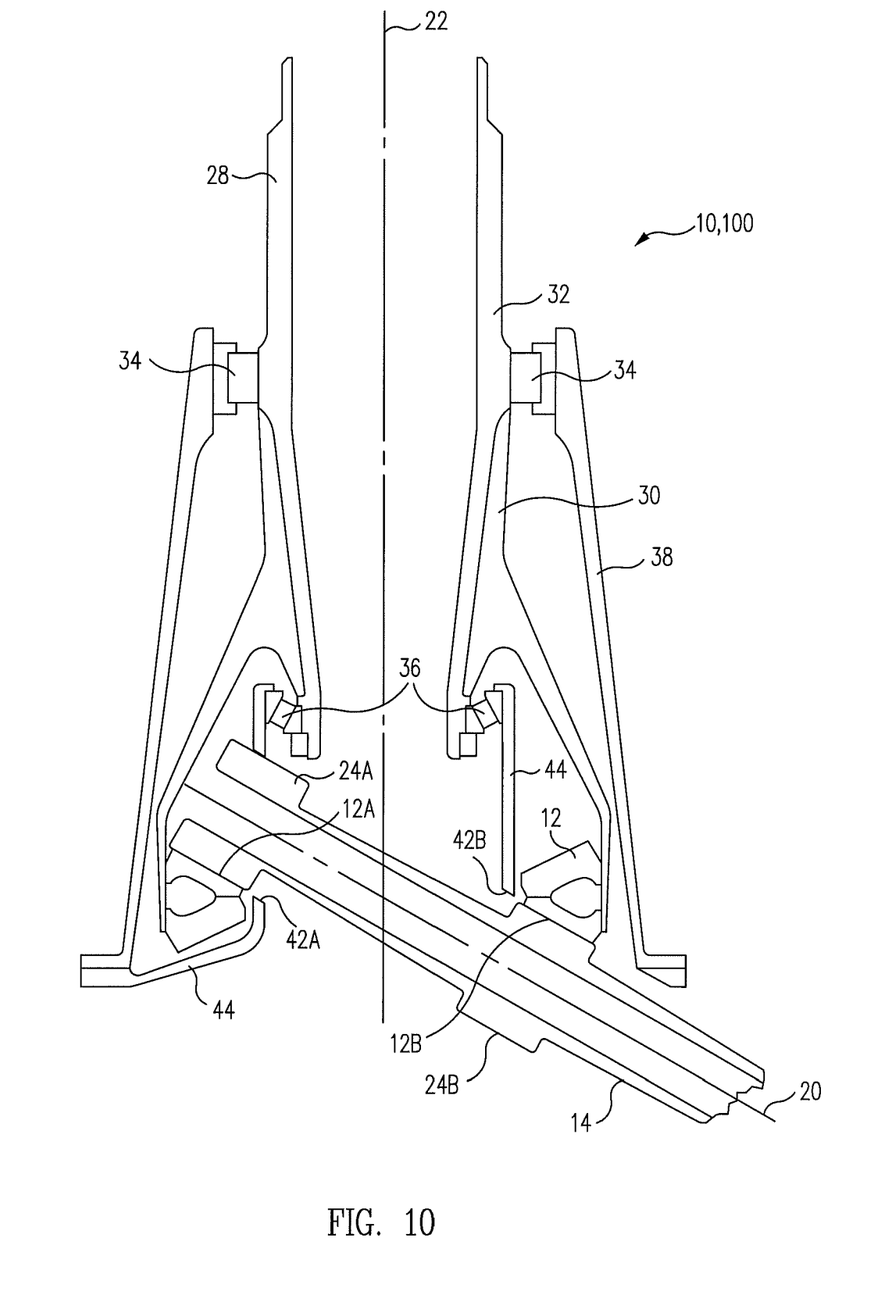
FIG. 10 is a cross-sectional elevation view of the first exemplary transmission; and, FIG. 11 is a side elevation view, partially in cross-section, of an exemplary helicopter incorporating the exemplary split torque transmission of FIGS. 2-4.

Additionally, as illustrated in the exploded view of FIG. 9 and the cross-sectional elevation view of FIG. 10, in the particular exemplary embodiment illustrated, the output shaft 28 is supported for rotation by the bearings 34 and 36 within a fixed, annular, frusto-conical bell housing or support 38. The support 38 includes an annular closure 40 fixed concentrically within the frusto-conical support. The closure includes a pair of pinion clearance openings 42 through which the first pinion 14 extends, and an annular flange 44 disposed at a first end thereof that has an outer periphery coupled to the large end of the frusto-conical support 38. In one possible embodiment, both the support 38 and the flanged closure 40 may, like the exemplary two-part output shaft 28, comprise a strong composite material, such as those described above, for weight reduction.

While only a single pinion 14 is shown in the exemplary embodiments illustrated in FIGS. 7-10, as described above, the transmission can be easily modified to incorporate a second driving pinion 14B, and requires only the provision of an additional pair of clearance holes 42A and 42B in the flanged closure 40 to accommodate the second pinion.

The single part torque input pinion 14 or pinions 14A and 14B, which may be hollow, or annular, as illustrated in the figures, for further weight reduction, transmits torque to the two oppositely facing bevel gears 12A and 12B of the ring gear 12, which advantageously can be fabricated as a single part by a continuous grinding process utilizing an abrasive plated grinding tool commonly used in automotive gear production. Unlike prior art ring gears, the ring gear of the exemplary transmissions 10 and 100 obviates the need for a heavy central hub.

Additionally, the input pinion 14 or pinions 14A and 14B drivingly rotate the ring gear 12, and the loads reacted from the ring gear are balanced, such that the input pinion(s) do not need to be supported by additional bearings, as required in conventional split torque transmissions. Since the input pinion or pinions transmit only a pure torque to the ring gear, the ring gear support bearings 34 and 36 can be substantially reduced in size. Thus, only two parts, viz., the pinion 14 and ring gear 12, are required to transmit as much power as is transmitted in conventional split torque transmissions by four parts, i.e., two pinions and two gears. The novel input pinion 14 does not require as many supporting bearings as prior art pinions, or indeed, any bearings at all, but rather, in one possible embodiment, can be supported by only a spline gear coupling 25 located at the input end of the pinion shafts 16.

The advantages of the novel transmissions 10 and 100 disclosed herein include increased power transmission and reduced weight. While the transmissions can be used in automotive, marine and many other applications, their advantageous application in helicopters and aircraft is manifest, due to their reduced weight and gear count. Their weight savings represent not only a saving in manufacturing costs due to their use of less of material, but they also enable a reduction in the overall operating costs of a helicopter.

Figure 11:
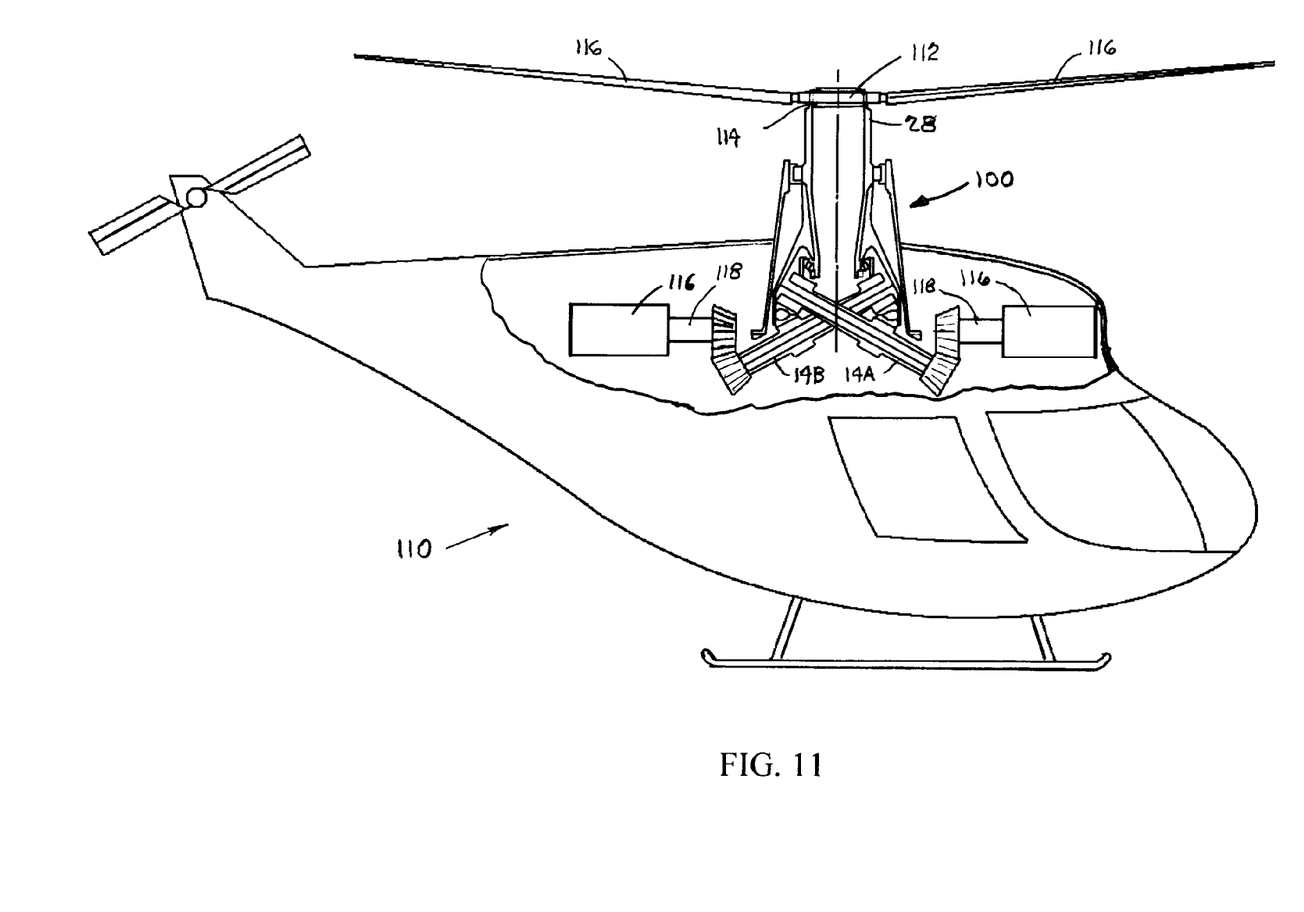

Thus, as illustrated in FIG. 11, in only one of many possible exemplary applications, a rotorcraft, e.g., a helicopter 110, may comprise a main rotor 112, including a power input shaft 114 and a plurality of rotor blades 116 coupled to the input shaft for rotation thereby, and an engine 116, e.g., a gas turbine engine, having an output shaft 118 for rotatably driving the input shaft 114 of the main rotor 112. The exemplary split torque power transmission 10 can be coupled between the output shaft 118 of the engine 116 and the input shaft 114 of the main rotor 112 by coupling the output shaft 28 of the transmission to the input shaft of the rotor, and the output shaft of the engine to the drive shaft 14 of the transmission. In another exemplary embodiment illustrated in FIG. 11, the helicopter 110 may incorporate two engines 116, in which case, the transmission 100 incorporating two drive shafts 14A and 14B can be coupled between the main rotor 112 and the engines 116, each driving a respective one of the drive shafts.

As those of skill in this art will by now appreciate, many modifications, substitutions and variations can be made in the materials, methods and implementations of the split torque geared power transmissions of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A split torque power transmission, comprising:
 a ring gear having a pair of oppositely facing hypoid gear faces respectively formed on opposite sides of a medial plane thereof;
 a first drive shaft laterally offset from a central axis of the ring gear perpendicular to its medial plane and comprising an elongated shaft extending through the medial plane of the ring gear and disposed at an oblique angle relative thereto, the first drive shaft including a pair of hypoid pinion gears mounted coaxially thereon and respectively disposed in conjugate meshing engagement with respective ones of the gear faces of the ring gear;
 a second drive shaft laterally offset and disposed on an opposite side of the central axis of the ring gear from the first drive shaft and comprising an elongated shaft extending through the medial plane of the ring gear and disposed at an oblique angle relative thereto, the second drive shaft including a pair of hypoid pinion gears mounted coaxially thereon and respectively disposed in conjugate meshing engagement with respective ones of the gear faces of the ring gear; and,
 an elongated annular output shaft coupled to a circumferential periphery of the ring gear.

2. The transmission of claim 1, wherein the output shaft comprises:
 an annular, frusto-conical input portion having an input end coupled to the circumferential periphery of the ring gear and an output end smaller than the input end; and, an annular output portion disposed coaxially with and having an input end coupled to the output end of the input portion.

3. The transmission of claim 1, wherein the output shaft comprises a composite material.

4. The transmission of claim 3, wherein the composite material comprises a plurality of reinforcing fibers embedded in a resin matrix.

5. The transmission of claim 4, wherein the reinforcing fibers comprise carbon, glass or boron fibers.

6. The transmission of claim 1, wherein the output shaft is supported by a plurality of bearings for rotation about a long axis thereof.

7. The transmission of claim 6, wherein the output shaft is supported for rotation within a fixed, annular, frusto-conical support.

8. The transmission of claim 7, further comprising an annular closure fixed concentrically within the frusto-conical support, the closure including a pair of clearance openings through which the first and second drive shafts extend, an annular flange disposed at a first end thereof, and an outer periphery coupled to an end of the support.

9. The transmission of claim 1, wherein:
first and second rotary engines are respectively coupled to respective input ends of the first and second drive shafts; and,
an output end of the output shaft is coupled to a main rotor of a rotorcraft.

10. A rotorcraft, comprising:
a main rotor, including a power input shaft and a plurality of rotor blades coupled to the input shaft for rotation thereby;
first and second engines having respective output shafts for rotatably driving the input shaft of the main rotor; and,
a split torque power transmission coupled between the output shafts of the engines and the input shaft of the main rotor, the transmission comprising:
a ring gear having a pair of oppositely facing hypoid gear faces respectively formed on opposite sides thereof;
a first drive shaft comprising an elongated shaft extending through a medial plane of the ring gear and disposed at an oblique angle relative thereto, the pinion including a pair of hypoid pinion gears mounted coaxially thereon and respectively disposed in conjugate meshing engagement with respective ones of the gear faces of the ring gear, and an input end coupled to the output shaft of the first engine;
a second drive shaft laterally offset and disposed on an opposite side of a central axis of the ring gear from the first drive shaft and comprising an elongated shaft extending through the medial plane of the ring gear and disposed at an oblique angle relative thereto, the second drive shaft including a pair of hypoid pinion gears mounted coaxially thereon and respectively disposed in conjugate meshing engagement with respective ones of the gear faces of the ring gear and an input end coupled to the output shaft of the second engine; and,
an elongated annular output shaft having an input end coupled to a circumferential periphery of the ring gear and an output end coupled to the input shaft of the main rotor.

11. The rotorcraft of claim 10, wherein the output shaft of the power transmission comprises a composite material.

12. The rotorcraft of claim 10, wherein the output shaft is supported for rotation within a fixed, annular, frusto-conical support by a plurality of roller bearings for rotation about a long axis thereof, and further comprising an annular closure fixed concentrically within the frusto-conical support, the closure including a pair of openings through which the first and second drive shafts respectively extend, an annular flange disposed at a first end thereof and an outer periphery coupled to an adjacent end of the support.

13. The rotorcraft of claim 11, wherein the output shaft is supported for rotation within a fixed, annular, frusto-conical support by a plurality of roller bearings for rotation about a long axis thereof, and further comprising:
an annular closure fixed concentrically within the frusto-conical support, the closure including a pair of openings through which the first and second drive shafts respectively extend, an annular flange disposed at a first end thereof and an outer periphery coupled to an adjacent end of the support.

* * * * *